May 29, 1923.
R. L. WILCOX ET AL
1,457,098
CONNECTION MECHANISM
Filed Feb. 6, 1922
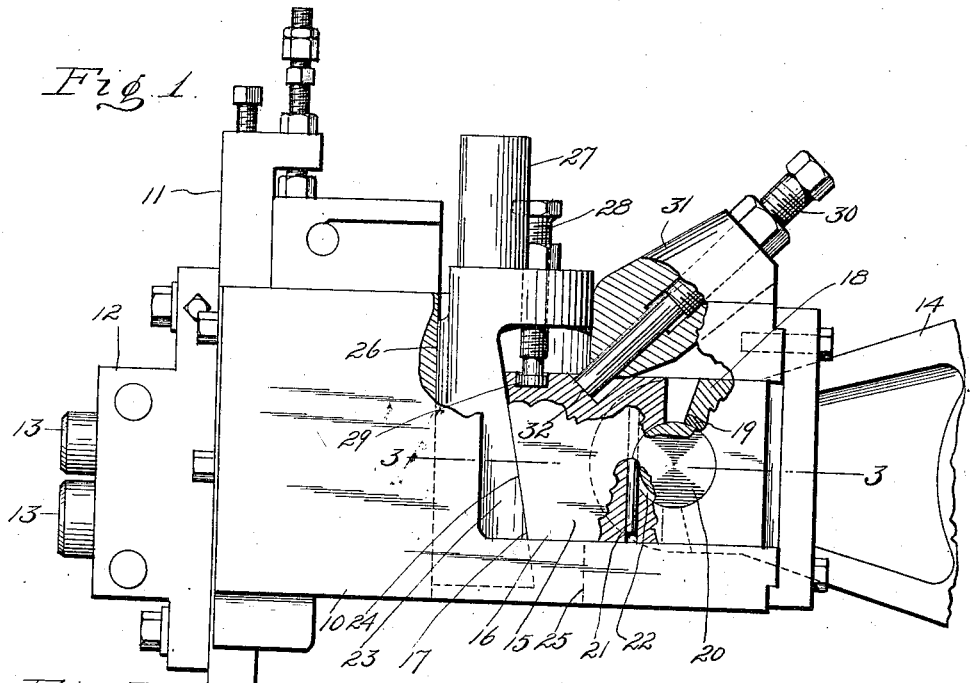
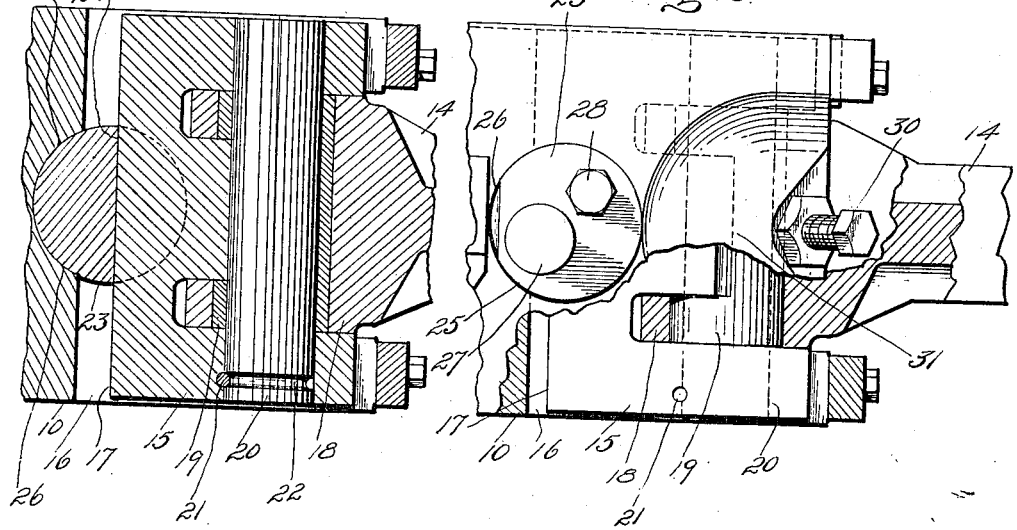

Patented May 29, 1923.

1,457,098

UNITED STATES PATENT OFFICE.

RICHARD LESTER WILCOX AND CLIFFORD O. PETITJEAN, OF WATERBURY, CONNECTICUT, ASSIGNORS TO THE WATERBURY FARREL FOUNDRY AND MACHINE COMPANY, OF WATERBURY, CONNECTICUT, A CORPORATION OF CONNECTICUT.

CONNECTION MECHANISM.

Application filed February 6, 1922. Serial No. 534,621.

*To all whom it may concern:*

Be it known that we, RICHARD LESTER WILCOX and CLIFFORD O. PETITJEAN, citizens of the United States, residing at Waterbury, in the county of New Haven and State of Connecticut, have invented certain new and useful Improvements in Connection Mechanisms, of which the following is a specification, reference being had therein to the accompanying drawings.

This invention relates to connection mechanisms and more particularly to such mechanisms as are used for operatively joining a toggle, a pitman or the like to a reciprocating member or the like. This type of mechanism is commonly used in upsetting or heading machines and therefore will be shown and described more particularly as it relates to such type, although not limited thereto.

It is the object of this invention, among other things, to provide an improved connection mechanism that in its construction and operation will not require an exact alignment of its parts, which will automatically adjust themselves, to so unite the reciprocating member with the pitman, or the like, that the strain on the connection therebetween will be reduced to the minimum, and the possibility of injury or breakage of the connection mechanism or the adjacent parts will be entirely eliminated.

Among other aims and objects of the invention may be recited the provision of mechanism of the character described with a view to compactness, in which the construction is simple and efficiency of operation high.

The improvements in the details and arrangement of parts will be apparent from an inspection of the accompanying drawings in connection with the description hereinafter contained and wherein a preferred embodiment of the invention is disclosed for the purpose of imparting an understanding of the same.

Referring to the drawings in which like characters of reference designate like parts in the several figures;

Figure 1 is a fragmentary side elevation of the gate and pitman or toggle of a heading or upsetting machine or the like, with our improved connection mechanism associated therewith;

Figure 2 is a fragmentary plan view thereof; and

Figure 3 is a fragmentary sectional plan view, taken generally upon line 3—3 of Figure 1.

The gate of a heading, upsetting machine or the like reciprocates within the bed through toggle mechanism or a pitman, actuated from a crank shaft, and associated with a gate block adjustable within the gate, its relative position being determined in part by a wedge. The block and wedge are of such shape and construction that the surface of the gate against which the wedge contacts should be at an exact right angle to the side of the gate. If not so aligned, even to a very minor degree, the tremendous heading strain will cause a relative cramping motion of the gate within the bed and a resulting unnecessary wear on the sides thereof, as well as the bed of the machine.

Our improved mechanism is so constructed and operated as to eliminate all possibility of such objectionable conditions, the block adjusting itself relatively to the gate irrespective of the angularity of the several surfaces.

Heretofore it has been the practice to connect the toggle or pitman and the gate block with means, rigidly secured either to the toggle or pitman or the block itself and generally by clamps, screws or the like. This not only required considerable labor and skill in the manufacture of the mechanism and the fitting thereof, but the pressure thereon while the crank, with which the toggle or pitman is connected, is passing the dead center has a tendency to shear off the screws, break the clamp mechanism, or both, and even sometimes the pin itself.

These objectionable features of the heretofore common practice of connections of this character are not present in our improved mechanism.

In the drawings 14 is the toggle or pitman, connected with and actuated generally by a crank shaft; 10 designates the gate of the usual type having the punch slide 11 movable therein carrying a punch block 12 with punches 13 therein.

The construction and operation of the parts just described are well known in the art and therefore require no further description herein, except as modified by our improvements.

The gate block 15 is mounted so as to slide in the opening 16 in the gate and has an angular rear face 17. In the hub 18 of the toggle or pitman is a bushing 19 through which and the gate block 15 projects the connection pin 20, so fitted as to rotate freely therein, and held against endwise movement when assembled, by the dowel-pin 21, which passes through the gate block 15 and an annular groove 22 in the pin.

This pin 20 is free to rotate and move axially, during assembly, and there are no clamps or screws to be subjected to excessive strain. In manufacturing our device it is only necessary to provide a straight cylindrical opening through the gate block and bushing and a straight cylindrical pin of such size as to freely rotate therein. As this pin 20 can be placed in the opening made to receive it with the fingers, no labor is required to assemble it.

The relative position of the gate block and gate is determined by a wedge heretofore made rectangular in cross-section, thus necessitating a face on the gate that is at exactly a right angle with the sides of the gate, to produce which requires both skill and labor. We have designed a wedge mechanism that entirely eliminates this and objections to the old form of wedge mechanisms and the accurate alignment of the several faces is not requisite.

In the drawings, 23 designates the wedge which is cylindrical in cross-section having a flat angular face 24 upon one side thereof, which contacts with the angular rear face 17 of the gate block.

The gate 10 is provided with a cylindrical opening 25 of substantially the same diameter as that of the wedge 23 and through which the latter moves in the adjustment of the block. The curved back 26 of the wedge is in contact with the curved wall of the opening 25 substantially as shown in Figure 3. This wedge is provided with the usual head 27 which is tapped slightly to move the wedge downwardly, the screw 28 being adjusted to permit this motion. In the adjusted position of the gate the screw 28 which impinges against the button 29, prevents further movement of the wedge, and the gate block is held rigidly by the screw 30 that is threaded through a lug 31 upon the gate, and contacts with the face 32 in the gate block.

By this form of wedge mechanism the gate block will adjust itself within the gate without cramping the latter in its ways, the wedge rotating freely about its axis so as to accommodate this movement.

Minor changes and alterations may be made within our invention, aside from those herein suggested, and we would therefore have it understood that we do not limit ourselves to the exact construction herein shown and described, but claim all that falls fairly within the spirit and scope of the appended claims.

What we claim as new and desire to secure by Letters Patent, is:

1. In a device of the character described, a gate; a block movably mounted therein; and a wedge between said block and gate adjustable in relation to said gate to accommodate the relative positions of the block thereon.

2. In a device of the character described, a gate; a block movably mounted therein; and a wedge between said block and gate adjustable in relation to said gate and in its adjusted positions having rotatable contact therewith.

3. In a device of the character described, a gate; a block movably mounted therein; a wedge between said block and gate, said wedge having a curved contact with one of said parts and a flat contact with the other of said parts.

4. In a device of the character described; a gate; a block movably mounted therein; and a wedge between said block and gate having a flat face and a curved face.

5. In a device of the character described, a gate; a block movably mounted therein; and a wedge between said block and gate that permits said block to have a rotatable contact with the gate.

6. In a device of the character described, a gate; a block movably mounted therein; a wedge between said block and gate having a rotatable contact with one of said parts when held in any of its several positions; and means for adjusting said wedge parallel to its length.

7. In a device of the character described, a gate; a block movably mounted therein; a wedge between said gate and block; and means for holding said wedge against movement in one direction when in any of its adjusted positions, the relation of said gate, block and wedge being such that when said wedge is in any of its adjusted positions said block may rock in relation to said gate.

8. In a device of the character described, a gate having a recess in one wall thereof; a block movably mounted therein; and a wedge between said block and gate having engagement with said recess upon one side and with said block upon the opposite side.

9. In a device of the character described, a gate; a block; a toggle or pitman; and means, as a cylindrical pin, fitted freely into said gate and toggle or pitman for operatively connecting said toggle or pitman and gate.

10. In a device of the character described, a gate; a block movably mounted therein; a toggle or pitman; and means for connecting said toggle or pitman with said block, comprising a cylindrical pin projecting through said block and toggle or pitman and free to rotate therein.

11. In a device of the character described, a gate; a block movably mounted therein; a toggle or pitman; means for connecting said toggle or pitman with said block, comprising a cylindrical pin projecting through said block and toggle or pitman and free to rotate therein; and means for holding said pin against endwise movement.

12. In a device of the character described, a gate; a block; and means for adjusting the relative endwise position of said block in said gate, which will permit of the lateral movement thereof when so adjusted.

In testimony whereof we have hereunto affixed our signatures.

RICHARD LESTER WILCOX.
CLIFFORD O. PETITJEAN.